UNITED STATES PATENT OFFICE.

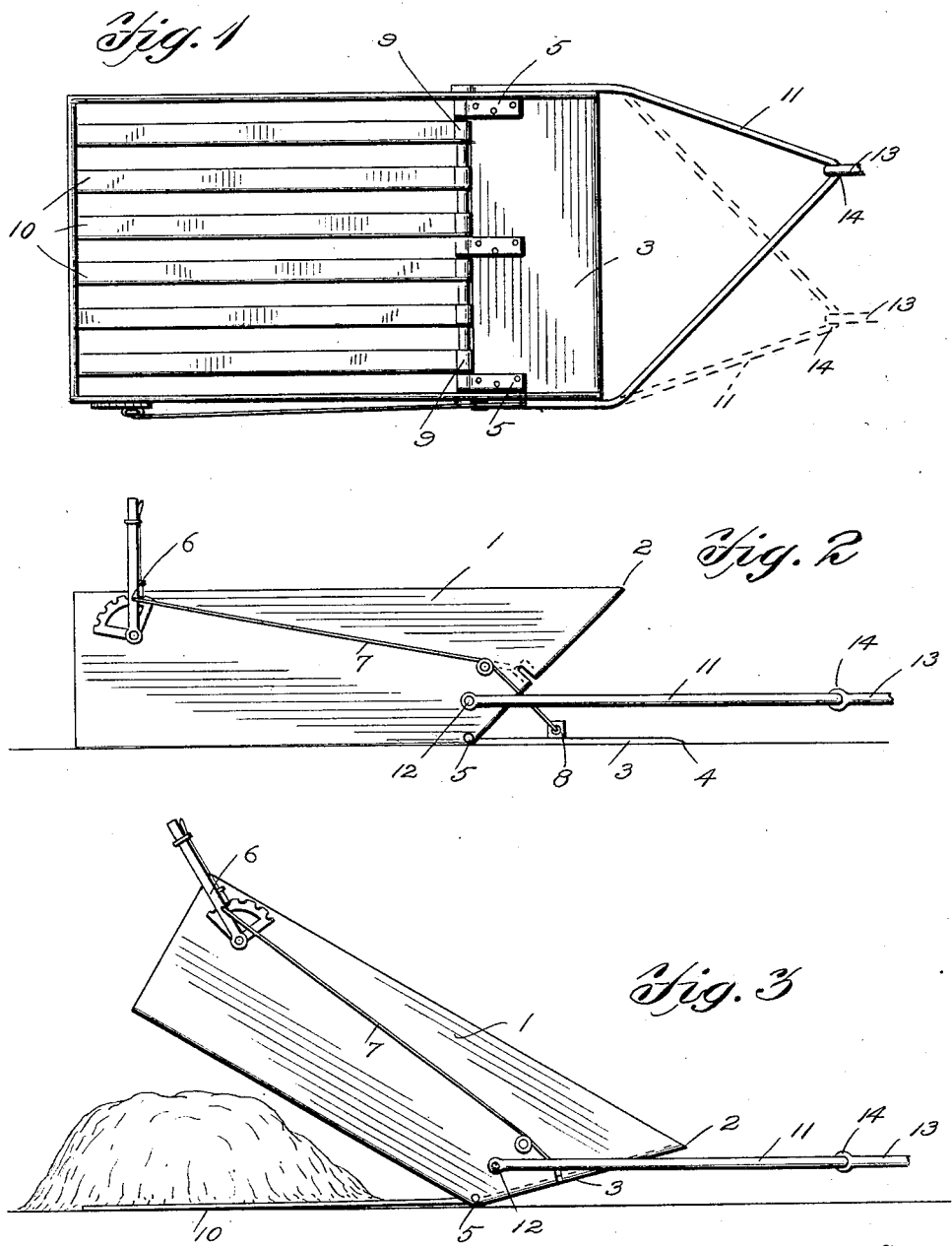

LUDVIG N. LAVANGER, OF ANETA, NORTH DAKOTA.

MANURE-CONVEYER.

1,050,366.　　　　　Specification of Letters Patent.　　Patented Jan. 14, 1913.

Application filed November 1, 1911. Serial No. 657,921.

*To all whom it may concern:*

Be it known that I, LUDVIG N. LAVANGER, citizen of the United States, residing at Aneta, in the county of Nelson and State of North Dakota, have invented certain new and useful Improvements in Manure-Conveyers, of which the following is a specification.

This invention relates to improvements in manure conveyers and has for its object to provide a simple, expeditious, and practical means for loading, unloading, and conveying manure from place to place.

In the drawings Figure 1 illustrates a bottom plan view of my improved manure dray. Fig. 2 is a side elevation of the dray in position for receiving a load. Fig. 3 is a side elevation of the dray in the act of dumping or depositing a load.

Referring more specifically to the accompanying drawings forming a part of the specification, numeral 1 indicates a dray body of the conventional type having its front end inwardly inclined at 2 from top to bottom. An end gate 3 having a knife edge 4 is hinged to the bottom part of the inclined portion 2 at 5, and the said end gate is adapted to be closed against inclined portion 2, or opened downwardly until it assumes the position shown in Fig. 2 as occasion demands. The opening and closing of end gate 3 is manually effected by the agency, of a brake lever 6 which communicates with the gate by a cord or cable 7 and is attached to said end gate 3 by suitable means at 8. On the bottom of the dray, as clearly illustrated in Fig. 1, are hinged to the forward portion, 9, a series of horizontally alined slats 10 which serve to retain the load within the body of the dray during transportation and also act as runners on which the dray is impelled over the surface of the ground. A draft bottom 11 is hingedly mounted on the forward portion of body 1 at 12 to which a draft chain 13 is fixed at 14.

The operation of my improved dray is substantially as follows: The dray is first brought into contact with the quantity of manure or like material and end gate 3 is thrown down against the surface of the ground until it assumes the position shown in Fig. 2, at which time the dray is then impelled forwardly against the material to be loaded, forcing same into the body of the dray by virtue of its forward movement. When the dray has been sufficiently loaded, end gate 3 is closed by applying lever 6, after which time the load is conveyed to its destination. In order to release the load, body 1 of the dray is tilted upwardly as shown in Fig. 3, by hand and the material comprising the load, by virtue of its weight, will impinge against the ground through the spaces between slats 10 and as the dray is impelled forwardly, the said material will remain stationary while the slats 10 of the dray will slide from under the load. The weight of the operator on the rear end of the body of the dray will prevent the body of the same from tilting when pull is exerted on the draft chain, it being noted that the point of connection of the draft member 11 with the body of the dray is below the central longitudinal line through the same.

While I have described and illustrated my invention in its preferred form, I do not limit myself to the exact construction herein specified, but reserve the right to make such modifications, alterations, and changes as may rightly come within the scope of my invention.

Having described my invention that which I claim and do desire to protect by Letters Patent is:

1. A self loading conveyer consisting of a body having a slatted bottom and hinged forward end, said end adapted to lie flat upon the ground, whereby it may be slid under the load of said conveyer, said body being hinged to said bottom, means on said body for raising said end and locking it in fixed relation to said body, the rear end of said body adapted to be raised from said bottom whereby said conveyer may be withdrawn from under its load.

2. A self-loading conveyer comprising a dray body having its forward end inwardly inclined from top to bottom, an end gate having a knife edge and hinged to the bottom part of said inclined portion and adapted to close against said inclined portion, means for opening and closing said end gate, and a bottom of horizontally alined slats hinged to the forward portion and serving as runners on which the dray may be impelled over the surface of the ground.

In testimony whereof I affix my signature in presence of two witnesses.

LUDVIG N. LAVANGER.

Witnesses:
C. A. FOSSUM,
C. G. ANDERSON.

---

Copies of this patent may be obtained for five cents each, by addressing the "Commissioner of Patents, Washington, D. C."